United States Patent [19]

Shahidi-Hamedani

[11] Patent Number: 4,746,185
[45] Date of Patent: May 24, 1988

[54] OPTICAL FIBRE COUPLERS

[76] Inventor: Ferrydon Shahidi-Hamedani, 2114A Danforth Avenue, Toronto, Canada, M4C 1J9

[21] Appl. No.: 877,524

[22] Filed: Jun. 23, 1986

[51] Int. Cl.$^4$ .............................................. G02B 6/26
[52] U.S. Cl. .............................. 350/96.15; 350/96.16; 156/654; 156/663
[58] Field of Search ............... 350/96.15, 96.16, 96.18, 350/96.30; 156/345, 654, 663

[56] References Cited

U.S. PATENT DOCUMENTS

| | | | |
|---|---|---|---|
| 3,891,302 | 6/1975 | Dabby et al. | 350/96.3 X |
| 3,933,455 | 1/1976 | Chown et al. | 65/4 |
| 3,995,935 | 12/1976 | McCartney | 350/96.18 X |
| 4,083,625 | 4/1978 | Hudson | 350/96.15 |
| 4,119,362 | 10/1978 | Holzman | 350/96.18 |
| 4,400,055 | 8/1983 | Ozeki et al. | 350/96.16 X |
| 4,449,781 | 5/1984 | Lightstone et al. | 350/96.15 |
| 4,566,753 | 1/1986 | Mannschke | 350/96.16 |
| 4,632,513 | 12/1986 | Stowe et al. | 350/96.15 X |

FOREIGN PATENT DOCUMENTS

| | | | |
|---|---|---|---|
| 0069054 | 1/1983 | European Pat. Off. | 350/96.15 |
| 57-186730 | 11/1982 | Japan | 350/96.15 |
| 60-86511 | 5/1985 | Japan | 350/96.16 |
| 2023874 | 1/1980 | United Kingdom | 350/96.15 |

*Primary Examiner*—John Lee
*Assistant Examiner*—Michael Menz

[57] ABSTRACT

Optical fibre couplers are formed by selectively etching the cladding layer of portions of the fibres forming the coupler to provide them with an undulating profile, converging a group of fibres so that the undulating profiles interlock, and fusing the interlocking portions without drawing the fibres, so as to form a fused coupling zone of blended core and cladding glass. The fused zone is inserted in a ferrule, or a cladding layer is applied having a numerical aperture selected to maintain a more or less constant numerical aperture through the coupler. Such couplers may be cut in half and the halves optically coupled to each other by applying lenses to the cut ends and inserting the halves from opposite directions into a housing containing refractive index matching fluid so that the focuses of the lenses coincide.

16 Claims, 3 Drawing Sheets

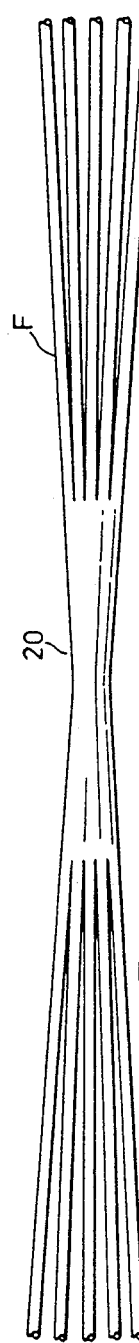
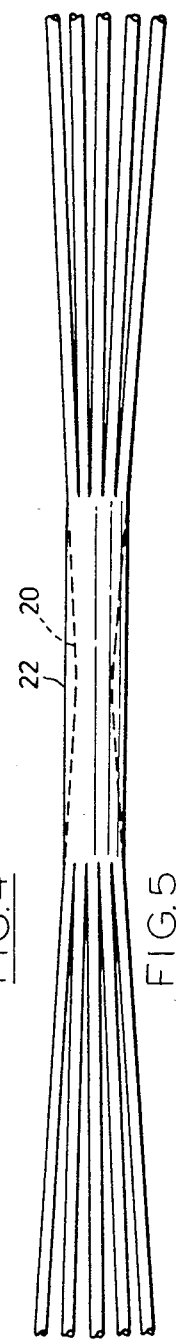
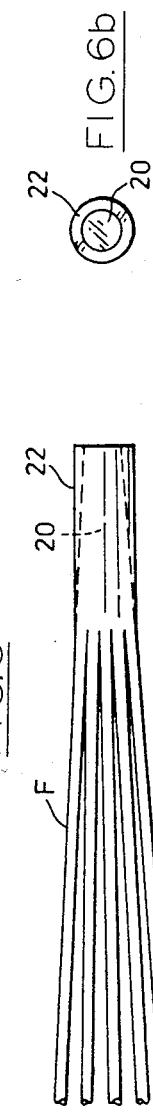
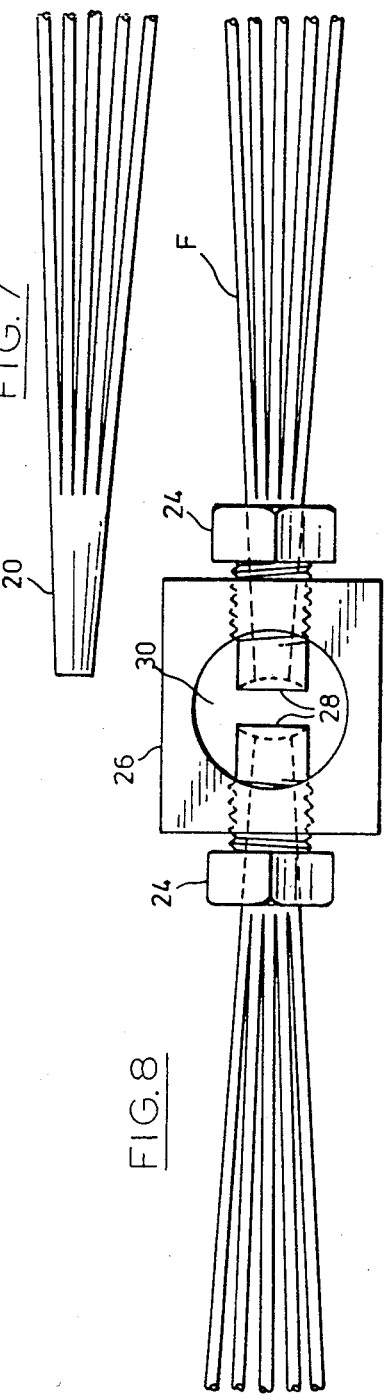

OPTICAL FIBRE COUPLERS

This invention relates to the coupling of optical fibres and in particular to optical fibre couplers of the type in which a number of fibres converge in a coupling zone, either so as to terminate at a common end face for coupling to a further fibre or group of fibres or some other optical component, or prior to diverging after transfer of light between the various fibres.

In order to achieve good performance it is important that the numerical aperture of the fibres be maintained so far as possible throughout the coupler, and misregistration and losses in the coupling zone be kept to a minimum. To achieve these objectives it is desirable that the fibres converge in the coupling zone to a greater extent than normal packing of the fibres would permit. Various approaches to this problem have been attempted, exemplified by the disclosures of U.S. Pat. Nos. 4,083,625 (Hudson) and U.S. Pat. No. 4,449,781 (Lightstone et al), and the prior art considered in those patents. In Hudson, the fibres are prepared so that end surfaces of the cores of fibres to be joined are in abutment, and the coupling zone is then fused and shaped in a fused condition to provide a tapered transition, or the fibres are shaped prior to fusion to provide the desired taper. The process is complicated by the desirability of maintaining continuity of the fibre cladding, whilst the small size of the fibres and the precise mating and orientation required of the exposed core surfaces would make implementation of the process very exacting and labour intensive.

An alternative approach is disclosed in the Lightstone et al patent, in which the fibres are etched so that the major portion of the cladding layer is removed, and are then fused together whilst being drawn out so that the fibre cores are biconically tapered adjacent the fusion zone. There is no direct contact between the cores of adjacent fibres, but the theory is that the biconical taper will increase the reflection angle of the light through the fusion zone, thus permitting light to pass between the cores of adjacent fibres in the fusion zone. Obviously the taper and the degree of etching of the cladding must be very carefully controlled, and the method disclosed involves continuous monitoring of light transfer between the fibres during the fusion and drawing process to achieve a desired degree of coupling. Since the arrangement is dependent upon promoting the escape of light from the fibre cores into the cladding, some leakage is inevitable. The results obtained are somewhat unpredictable, as is illustrated by the widely varying transmission losses shown by the examples, and disparities can occur in the performance of different ports of the same coupler. The technique is also difficult to implement because of problems in controlling etching of the fibres so that a uniform thin layer of cladding remains throughout the portions of the fibres to be tapered and fused.

U.S. Pat. No. 4,566,753 to Mannschke shows a coupler using groups of tapered fibres coupled through a graded index rod lens. This patent utilizes the lens to collect and avoid loss of the light escaping from the tapered portions of the fibres.

U.S. Pat. No. 3,933,455 to Chown discloses a method for processing the ends of optical fibre bundles by tapering the fibre ends by etching so as to improve their packing, inserting the ends in a low refractive index glass tube, and heating and drawing down the fibres in the tube to form a solid glass core. There is however no disclosure of the application of this technique to a reflective or transmission type coupler for individual fibres. An object of the present invention is to provide couplers through which a consistent numerical aperture may be maintained, in which losses can be maintained at a low level in which a very high level of uniformity of optical signal strength can be obtained in all parts and which can be readily manufactured on an industrial scale.

Accordingly the invention provides a method of manufacturing couplers for optical fibres, comprising etching the cladding glass of fibres to be coupled along lengths of the fibres from which the coupling is to be formed so as to remove most of the cladding layers of the fibres, selectively increasing the intensity of etching in certain zones of the etched lengths so as to remove all of the cladding glass from the core glass in those zones, bringing the fibres into general longitudinal alignment and positioning the fibres so that their selectively etched zones interengage to provide close abutment between the fibres in those zones, fusing those zones together whilst holding the fibres to prevent drawing of their cores, so as to form a fused coupling zone in which the core and cladding glasses are blended, and surrounding the peripheral surface of the fused coupling zone with means to prevent loss of light therefrom. Preferably the intensity of etching is selectively increased in a plurality of longitudinally spaced zones along each fibre so as to provide the fibre with a substantially sinusoidally undulating exterior profile, and the fibres are longitudinally positioned relative to one another so that the profiles of adjacent fibres interlock. The peripheral layer around the fused coupling zone may be provided either by a ferrule or by a layer of a transparent substance having a refractive index such as to maintain a substantially constant numerical aperture through the coupler.

The invention extends to an optical fibre coupler formed from fibres having a glass core and a glass cladding layer of lower refractive index, wherein the fibres coupled have portions with a greatly reduced thickness of cladding layer and untapered cores which converge into a coupling zone formed from the glass of the cores and claddings of the fibres, blended by fusion so that glass in the coupling zone has a refractive index intermediate between that of the core and the cladding, and wherein means are provided peripherally surrounding the coupling zone to prevent escape of light therefrom.

Further features of the invention will become apparent from the following description of preferred embodiments with reference to the accompanying drawings, in which:

FIG. 4 shows a group of fibres following fusion;

FIG. 5 illustrates a coupler completed by the application of a replacement cladding layer to the fusion zone.

FIG. 6a shows how the coupler of FIG. 5 may be cut in half to provide two similar units, each having an end face as illustrated in FIG. 6b;

FIG. 7 illustrates how the fibre assembly of FIG. 4 may be cut in two; and

FIG. 8 illustrates how units such as those shown in FIG. 6a may be coupled.

Figure 1:
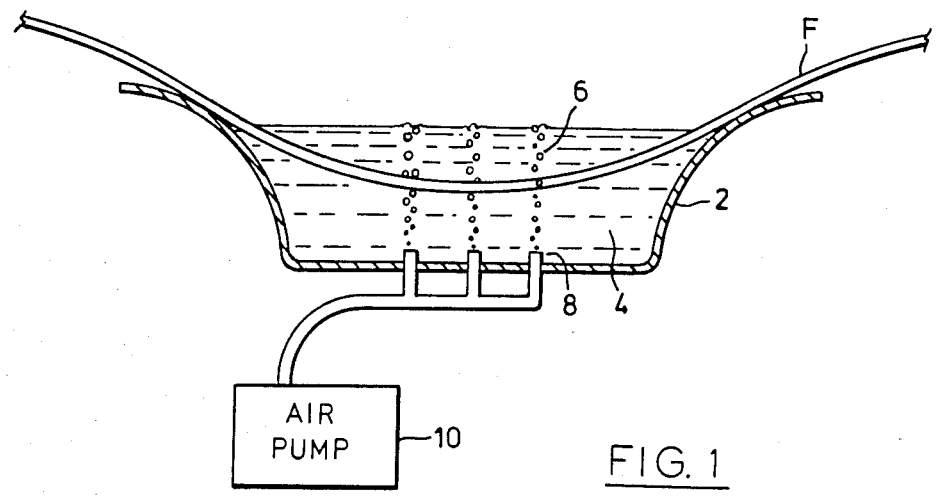
FIG. 1 is a diagrammatic cross section through an etching bath for the preparation of fibres for use in couplers.

Referring to FIG. 1, optical fibres to be formed into star or directional couplers are prepared firstly by stripping the outer protective jacket normally applied to such fibres over a distance of, typically, about 4 centimeters. A group of fibres F so prepared is arranged in parallel and then draped over a bath 2 of etchant 4 so that the portions from which the jacket has been removed dip into the etchant, which is selected to attack the fibre material, normally silica. Typically, the etchant is a blend of hydrofluoric and nitric acids.

Figure 2:
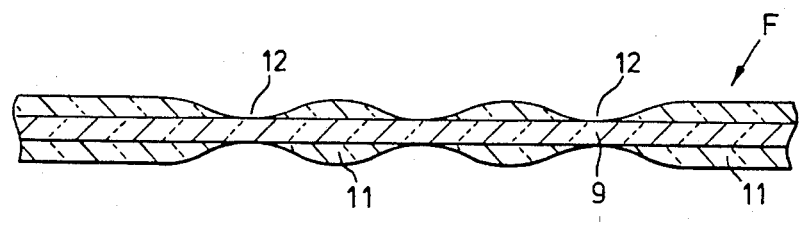
FIG. 2 is a diagrammatic cross section through a prepared fibre.

In order to etch the fibres to a desired profile, as shown in FIG. 2, the etchant is locally agitated by streams 6 of air bubbles emerging from nozzles 8 located in the bottom of the bath and fed by a small air pump 10. The amount of air required is readily supplied by a pump similar to those used for the aeration of domestic fish tanks. For clarity of illustration, no attempt has been made in the drawings to show components to scale. Typically the nozzles 8 are about 1.25 cm apart, about 2 mm in diameter, and located about 1–2 cm below the fibres. The intense local agitation of the etchant provided by the bubble streams results in etching of the fibres proceeding faster in the areas of impingement of the bubbles than elsewhere, so that the etched fibres assume a cross sectional profile as illustrated in FIG. 2. The fibres are withdrawn from the bath and washed clean of excess acid when etching has proceeded to the point such that substantially all the cladding 11 has been removed from the fibre core 9 in spaced zones 12 equal in number and spacing to the number and spacing of the nozzles 8, and the cross sectional profile of the fibre surface shows approximately sinusoidal undulations. The number of bubblestreams can be varied, and whilst three is in most cases preferred, two or four or more could be utilized.

Figure 3:
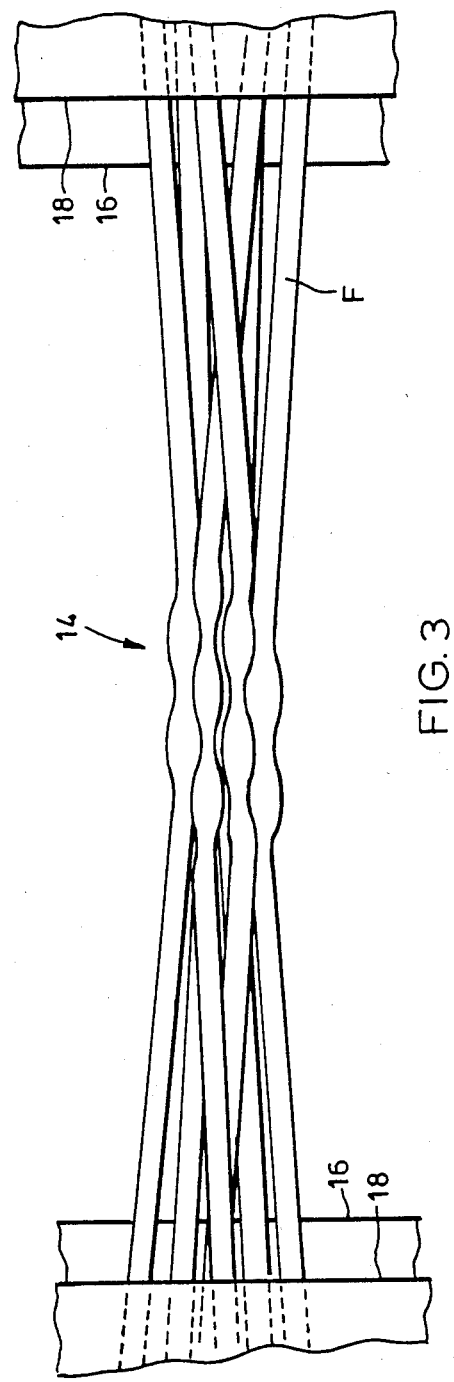
FIG. 3 shows prepared fibres assembled together prior to fusion.

By staggering the longitudinal positions of adjacent fibres as illustrated in FIG. 3, and by causing the fibres F to follow slightly curved paths, the sinusoidally undulating portions of the fibres can be brought into close abutment in a zone 14. They can be retained in this relationship during subsequent processing by braiding the fibres in the approaches to the abutment zone using further interweaving of the fibres similar to that shown in FIG. 3, and by retaining the fibres on supports 16 using clamping members or adhesive tape 18. The zone 14 is then subjected to gas or electric heating, using a gas fired ring burner, an annular electric heating element or a gas flame moved around the zone, so as to fuse the glass and allow the core glass and the remaining cladding glass to fuse together into a more or less homogeneous mass, resulting in a fibre assembly as shown in FIG. 4, in which the individual fibres merge into a fusion zone 20 in which the glass has a refractive index intermediate between that of the fibre cores and that of the fibre cladding, according to the amount of cladding glass remaining after etching. There is no drawing and therefore tapering of the fibre cores entering the fusion zone. It will of course be understood that the number of fibres utilized will depend on the application and may be any number from two upwards rather than the four or five fibre assemblies shown in the drawings.

Subsequent treatment of the assembly depends upon the type of coupler to be produced. If a coupler having the same number of input and output fibres is required, then it may be treated as shown in FIG. 5 by the application of a replacement cladding layer 22 to the fusion zone 20.

Since the refractive index of the fusion zone has been decreased relative to that of the fibre cores by the admixture of glass from the cladding layer, the cladding layer is formed from a substance, conveniently a transparent silicone compound, selected so as to have a refractive index relative to that of the glass of the fusion zone such that the numerical aperture of the fusion zone is substantially equal to that of the original fibres. To complete the coupler unit, a close fitting jig or casing is secured around the layer 22 and adjacent portions of the fibres and secured in place with optical epoxy resin which may also form the layer 22 assuming availability of a resin which can provide appropriate refractive index matching. The fibre strands leading to the fusion zone are then provided with protective sleeving and the central portion of the unit potted with suitable material such as epoxy resin within an outer casing. The external packaging does not have any effect on the optical characteristics of the unit and may be varied to suit requirements.

If the coupler is to be connected to another optical component then the unit of FIG. 5 may be cut in half and the ends ground and polished to provide two identical units, as shown in FIG. 6a, each having an end face as shown in FIG. 6b, in which the cladding layer 22 surrounds the fused zone 20. Such units may be cemented directly into ferrules 24 as shown in FIG. 8. The ferrules are then positioned in a coupling block 26, for example by threading the ferrules so that they may be screwed into the block. Such an arrangement is particularly useful when the number of input and output fibres required is different at the front and so that fibres are of different configuration or diameter, or when a single fibre F is to be coupled to multiple fibres. If a single fibre is used, a prepared end of the fibre is cemented directly into a ferrule 24. Each ferrule incorporates a lens 28 mounted at its inner end, coupled to the end face of the fibre by a liquid typically a silicone, which is selected to match the refractive index of the fused zone 20 (or the fibre core in the case of a single fibre). The lenses associated with the ferrules face each other on a common axis within a housing 30 in the coupling member 26, which is also filled with the refractive index matching fluid to submerge the inner ends of the ferrules. The lenses are selected, and the ferrules are positioned in the housing so that the focal points of the two lenses coincide, this being readily achieved by moving the ferrules in the housing so as to obtain maximum light transmission through the unit. The ferrules 24 prevent light from escaping the fused cores 20, and therefore the layer 22 may be unnecessary, although its presence is advantageous in applications where optimized coupling coefficiency and minimized back-scattering are desired. In applications where the layer 22 is considered unnecessary, the unit of FIG. 4 is cut in half prior to the application of that layer to provide units as shown in FIG. 7, the fused zone 20 of which may be cemented directly into the ferrules 24, in a manner similar to that shown in FIG. 8. The use of the carefully selected refractive index matching fluid within the housing 30 prevents losses due to unnecessary refractive index transitions, whilst the selection of lenses of appropriate focal length, so that the fused cores 20 subtend equal angles at the common focus, avoids loss of light when connecting units have cores of different diameter.

The techniques described above not only provide couplers which can be made to have very low losses, but provide considerable manufacturing advantages. The etching of the fibres is made deliberately non uniform, the undulating profiles facilitating packing of the fibres in the fusion core, and providing interlocking between the fibres which reduces the risk of the extremely delicate fibres being damaged during subsequent handling in the course of the manufacturing process. The etching process is much easier to control, since rather than attempting to leave the thinnest possible layer of cladding without anywhere attacking the cores, as in the Lightstone et al patent, the etchant may be allowed to reach the core in the zones 12 without the risk of the core being attacked outside what will become the fusion zone. Since the cladding of the etched fibres through the undulating zones is discontinuous, the cladding and core glasses tend to merge on fusion, rather than remaining in discrete layers as in the Lightstone et al process. This means that very high coupling coefficients can be readily achieved with consistently low losses. No biconical tapering of the fibre cores is required, with the risk of light loss and extreme physical fragility associated with such tapers; both outright fractures and localized microfractures have an increased incidence in tapered fibres. Furthermore, the absence of core taper means that the present invention is applicable to the manufacture of couplers for single mode as well as multi mode applications. Although the foregoing description has assumed the use of step-index fibres, the invention is equally applicable to graded index fibres.

Although the bubble stream technique described above is simple and effective in providing the desired selective etching of the fibres, other techniques may be employed. For example, an ultrasonic standing wave pattern set up in the etching bath around the relevant zone of the fibres will produce a similar effect.

I claim:

1. An optical fibre coupler formed from fibres having a glass core and a glass cladding layer of lower refractive index, whrein the fibres coupled have portions with a greatly reduced thickness of cladding layer and untapered cores which converge into a coupling zone formed without drawing from glass of the cores and claddings of the fibres, blended by fusion so that glass in the coupling zone has a refractive index intermediate between that of the core and the cladding, and wherein means are provided peripherally directly surrounding the coupling zone to prevent escape of light therefrom. from.

2. A coupler according to claim 1, wherein the means to prevent escape of light is a layer of a transparent substance surrounding the coupling zone and having a refractive index which is lower than that of the coupling zone and selected to maintain a substantially constant numerical aperture through the coupler.

3. A coupler according to claim 1, wherein fibres converge into both ends of an integral coupling zone.

4. A coupler according to claim 1, wherein the fibres converge into one end of the coupling zone and the means to prevent escape of light comprises a ferrule surrounding the periphery of the coupling zone.

5. A coupler according to claim 4, wherein the ferrule supports a lens adjacent the other end of the coupling zone and coupled thereto by a refractive index matching fluid.

6. A coupler assembly comprising a housing defining a central chamber and opposed coaxial bores entering the chamber from opposite sides, the chamber being filled with refractive index matching fluid and the ferrules of couplers according to claim 5 being inserted in the bores so that their lenses have a common focus.

7. A method of manufacturing couplers for optical fibres, comprising etching the cladding glass of fibres to be coupled along lengths of the fibres from which the coupling is to be formed so as to remove most of the cladding layers of the fibres, selectively increasing the intensity of etching in multiple spaced zones of the etched length so as to remove all the cladding glass from the core glass in those zones, bringing the fibres into general longitudinal alignment and positioning the fibres so that their selectively etched zones interengage to provide close abutment between the fibres in those zones, fusing these zones together, while holding the fibres to prevent drawing of their cores, so as to form a fused coupling zone in which the core and cladding glasses are blended, and directly surrounding the peripheral surface of the fused coupling zone with means to prevent loss of light therefrom.

8. A method according to claim 7, wherein the intensity of etching is selectively increased in a plurality of longitudinally spaced zones along each fibre so as to provide the fibre with a substantially sinusoidally undulating exterior or profile, and the fibres are longitudinally positioned relative to one another so that the profiles of adjacent fibres interlock.

9. A method according to claim 8, wherein the intensity of etching is selectively increased in said spaced zones by passing streams of gas bubbles through a bath of etchant in which the fibres are immersed so as to impinge on said zones of the fibres.

10. A method according to claim 8, wherein the fibres are secured in position relative to each other in zones to either side of the portions to be fused, prior to the fusion operation.

11. A method according to claim 10, wherein the fibres are braided.

12. A method according to claim 10, wherein the fibres are secured to spaced supports to either side of the fusion zone.

13. A method according to claim 7, wherein the peripheral surface of the fused coupling zone is surrounded with a layer of transparent substance having a refractive index selected to maintain a substantially constant numerical aperture through the coupler.

14. A method according to claim 7, wherein the coupler is cut in two through the fused coupling zone to form two coupler units, and the fused coupling zone of each unit is bonded into a ferrule.

15. A method according to claim 4, wherein the ferrule supports a lens at its end adjacent the cut end of the unit, and including the step of introducing a refractive index matching fluid into the ferrule between the lens and the fused zone.

16. A method according to claim 15, including the step of moving the ferrules of two units into opposed bores in the wall of a hollow housing filled with refractive index matching fluid, so as to submerge the ferrules, so that the focal points of the lenses coincide.

* * * * *

UNITED STATES PATENT OFFICE
CERTIFICATE OF CORRECTION

PATENT NO. : 4,746,185
DATED : May 24, 1988
INVENTOR(S) : Ferrydon Shahidi-Hamedani It is certified that error appears in the above-identified patent and that said Letters Patent are hereby corrected as shown below:

On the title page, the address of the inventor should be:

2144A Danforth Avenue, Toronto, Canada, M4C 1J9.

Signed and Sealed this

Eleventh Day of October, 1988

*Attest:*

DONALD J. QUIGG

*Attesting Officer*  *Commissioner of Patents and Trademarks*